(12) United States Patent
Yu

(10) Patent No.: US 6,297,450 B1
(45) Date of Patent: Oct. 2, 2001

(54) RECEPTACLE WALL PLATE HAVING A REPLACEMENT PORTION

(76) Inventor: Jeff Yu, 1101 S. Winchester Blvd. Suite I-207, San Jose, CA (US) 95128

( * ) Notice: Subject to any disclaimer, the term of this patent is extended or adjusted under 35 U.S.C. 154(b) by 0 days.

(21) Appl. No.: 09/391,727

(22) Filed: Sep. 8, 1999

(51) Int. Cl.[7] ...................................................... H02G 3/14
(52) U.S. Cl. .............................. 174/66; 174/67; 174/48; 439/536
(58) Field of Search .................................. 174/66, 67, 48; 220/241, 3.8; 439/535, 652, 107, 620, 214, 502; 361/118; D13/160

(56) References Cited

U.S. PATENT DOCUMENTS

| D. 342,055 | * | 12/1993 | Wakefield | D13/160 |
|---|---|---|---|---|
| D. 369,784 | * | 5/1996 | Pogue et al. | D13/160 |
| 5,384,428 | * | 1/1995 | Luu | 174/66 |
| 5,418,328 | * | 5/1995 | Nadeau | 174/48 |
| 5,700,978 | * | 12/1997 | Huff | 174/66 |
| 5,788,521 | * | 8/1998 | Milan | 439/214 |
| 5,969,932 | * | 12/1999 | Ryan et al. | 361/118 |
| 6,005,189 | * | 12/1999 | Anker | 174/66 |
| 6,045,399 | * | 4/2000 | Yu | 439/502 |
| 6,046,904 | * | 4/2000 | Kubat | 174/66 |

\* cited by examiner

*Primary Examiner*—Dean A. Reichard
*Assistant Examiner*—Angel R. Estrada

(57) ABSTRACT

A replaceable wall plate is disclosed. It includes a replaceable portion and a wall plate portion. The wall plate portion is typically screwed to a wall to form the cover of a wall outlet whereas the replaceable portion is removably attached to the wall plate portion. The removable attachment scheme is preferably accomplished for the two portions using the methods of prong insertion, button coupling or channel sliding. The replaceable portion further contains built-in electronics such as a surge protection device. It is configured in the replaceable portion for protecting electrical devices plugged or connected to the receptacles of this wall outlet. Accordingly, the replaceable portion along with its built-in surge protection device could be replaced such as in the case of electronics failure after an abnormal electrical event, for example, a voltage spike. In addition, in order to lengthen operation life, the replaceable portion is configured such that the surge protection device receives electricity only when a plug is inserted through the receptacle.

17 Claims, 3 Drawing Sheets

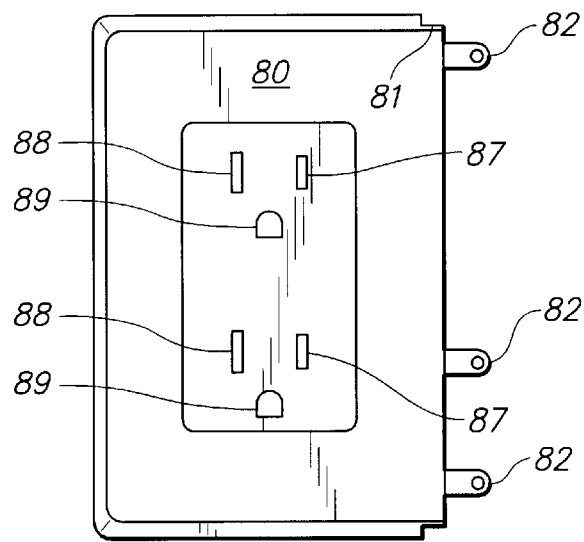
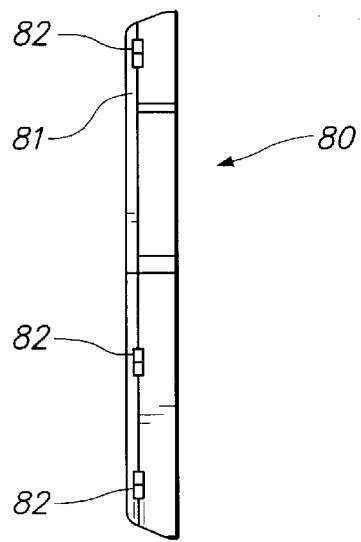
*FIG. 5*
*FIG. 7*
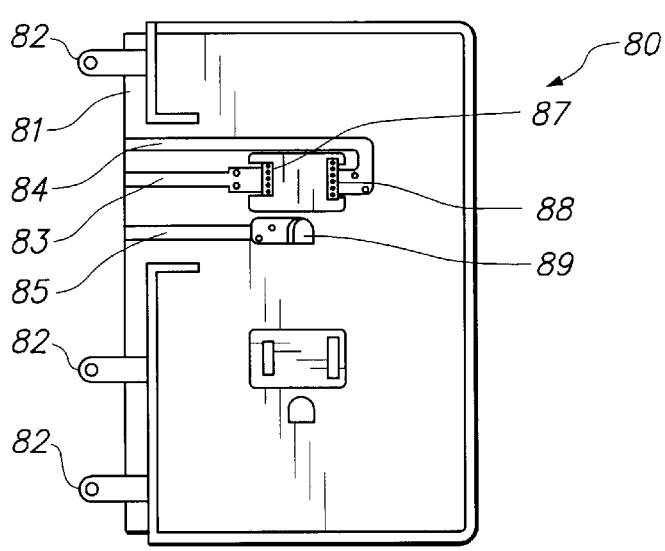
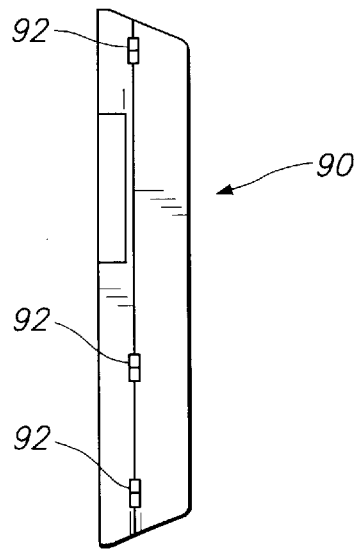
*FIG. 6*
*FIG. 8*

RECEPTACLE WALL PLATE HAVING A REPLACEMENT PORTION

TECHNICAL FIELD

The present invention relates generally to a replaceable wall plate. More in particular, the present invention relates to a receptacle wall plate including a replaceable portion removably attached to a wall plate portion. This replaceable portion contains built-in electronics such as surge protection circuitry that could be replaced in the case of electronics failure after current spikes or voltage surges.

BACKGROUND ART

It is well known that a variety of electrical surge protection devices have long been used for the protection of electrical equipment from electrical spikes that occur from time to time in power lines. Each surge protection device typically serves one or more electrical devices that are deemed to be particularly important to protect, usually because of the expense or the severe problems that can result from the equipment being taken out of service.

One typical implementation discloses a surge protection device being embodied inside a power strip whereby protecting the receptacles of that power strip. Accordingly, this protection device is not readily removable and therefore, once the surge protection device is triggered and used, the replacement cost for the device would uneconomically include the cost of another power strip.

Another implementation discloses a surge protection device being "sandwiched" by an electrical outlet (e.g., a wall outlet, a power strip) and the plug of an appliance being protected. More specifically, an electrical appliance for which surge protection is sought is plugged into a receptacle provided on the backside of the surge protection device. Prongs on the front side of the surge protection device are then plugged into an electrical outlet to electrically connect the electrical appliance to the power line. The surge protection elements of the device protect the electrical appliance from transient voltage surges on the power line. Disadvantageously, the size of the combination resulting from coupling the appliance with the surge protection device often is too bulky. Therefore, it does not provide sufficient room for other electrical appliances to be plugged into the receptacles of the electrical outlet that are immediately adjacent to the receptacle where the combination is connected.

Yet another surge protection device includes prongs for mating with a receptacle of an electrical outlet such as a wall outlet or a power strip. The device further includes a housing that contains surge protection electronics for protecting all of the receptacles of that electrical outlet. Unfortunately, the surge protection device itself takes up a receptacle.

A need therefore exists for providing a surge protection device that is readily accessible for removal ease and replacement convenience. Such a device should also be easily replaced with as economical a cost as possible. Furthermore, it is desired that the operation of the device does not require the use of an electrical receptacle.

SUMMARY OF THE PRESENT INVENTION

Accordingly, It would be desirable and therefore an object for the present invention to provide a surge protection device that is readily accessible for removal ease and replacement convenience. It is another object for the present invention to be easily replaceable with as economical a cost as possible.

It is yet another object for the present invention not to take up any electrical receptacle during operation. Additional objects and advantages of the present invention will be set forth in the description that follows, and in part, will be obvious from the description or may be learned by practice of the invention.

Briefly, a replaceable wall plate is provided to include a replaceable portion and a wall plate portion. The wall plate portion is typically screwed to a wall to form the cover of a wall outlet whereas the replaceable portion is removably attached to the wall plate portion. The removable attachment scheme is preferably accomplished for the two portions using the methods or prong insertion, button coupling or channel sliding. The replaceable portion further contains built-in electronics such as a surge protection device. It is configured in the replaceable portion for protecting electrical devices plugged or connected to the receptacles of this wall outlet. Accordingly, the replaceable portion along with its built-in surge protection device could be replaced such as in the case of electronics failure after an abnormal electrical event, for example, a voltage spike. In addition, in order to lengthen operation life, the replaceable portion is configured such that the surge protection device receives electricity only when a plug is inserted through the receptacle.

BRIEF DESCRIPTION OF THE DRAWINGS

A better understanding of the present invention can be obtained by considering the following detailed description taken together with the accompanying drawings that illustrate preferred embodiments of the present invention in which:

FIG. 5 is a front elevational view of a wall plate portion of a preferred embodiment configured for prong-insertion attachment;

FIG. 6 is a rear elevational view of the wall plate portion of the preferred embodiment configured for prong-insertion attachment;

FIG. 7 is a side elevational view of the wall plate portion of the preferred embodiment configured for prong-insertion attachment; and FIG. 8 is a side elevational view of a replaceable portion of the preferred embodiment configured for prong-insertion attachment.

DETAILED DESCRIPTION OF THE PREFERRED EMBODIMENTS

With today's state in wall plate technology, any wall plate designs generally do not require the rendering of fully detailed implementation diagrams. The definition of mechanical and electrical functionality allows those skilled in the art to design the wall plate implementations. Accordingly, functionality will be described in detail with the accompanying drawings. Those of ordinary skill in the art, once given the following descriptions of the various aspects of the present invention will be able to implement the necessary mechanical and electrical arrangements in suitable technologies without undue experimentation.

Reference will now be made in detail to the preferred embodiments of the present invention, examples of which are illustrated in the accompanying drawings. While the invention will be described in conjunction with the preferred embodiments, it will be understood that they are not intended to limit the invention to those embodiments.

Figure 1:
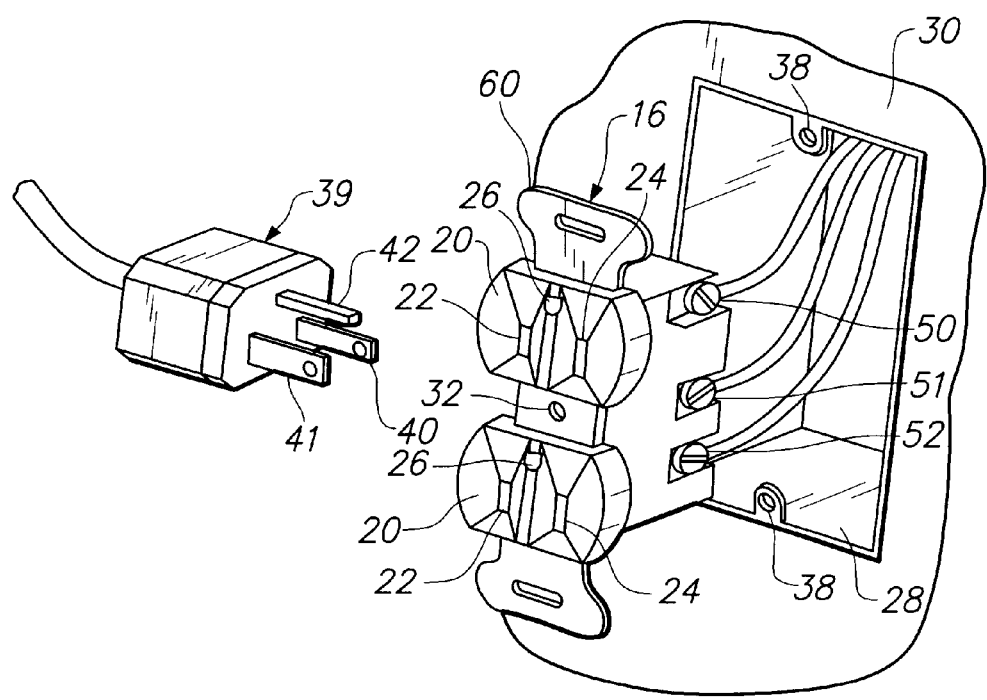
FIG. 1 is a perspective view of a typical duplex electrical receptacle being connected to a typical wall outlet.

FIG. 1 illustrates the inside of a typical wall outlet 30. It includes a typical duplex electrical receptacle 16 connected to a power line. The duplex receptacle 16 includes two receptacles 20 each having apertures to receive a plug 39. A neutral prong 41 may be received into a neutral aperture 24 of the receptacles 20. A hot prong 40 of the plug 39 may be received into a hot aperture 22 of the receptacles 20, whereas a ground prong 42 may be received into a ground aperture 26 of the receptacles 20. The duplex receptacle 16 further includes a ground screw 50 for connection via a wire to the ground of the power line. Similarly, a hot screw 51 and a neutral screw 52 of the duplex receptacle 16 connect via wires to the power source. Screws 50, 51,52 are typically used to catch and to hold the connection wires. The duplex receptacle 16 is further configured to electrically couple the hot 51, neutral 52 and ground 50 screws to the hot 40, neutral 41 and ground 42 prongs, respectively, of the plug 39 that are inserted into the receptacle apertures 22,24,26. The entire duplex receptacle 16 is fitted into the inside of a outlet box 28 of the wall outlet 30. It is further screwed onto the outlet box 28 through the holes in the mounting flanges 60 of the duplex receptacle 16 and through mounting holes 38 of the outlet box 28. Finally, the wall outlet 30 is operatively formed when a wall plate (not shown) is then screwed onto the outlet box 28 using a wall plate screw hole 32 of the duplex receptacle 16.

Figure 2:
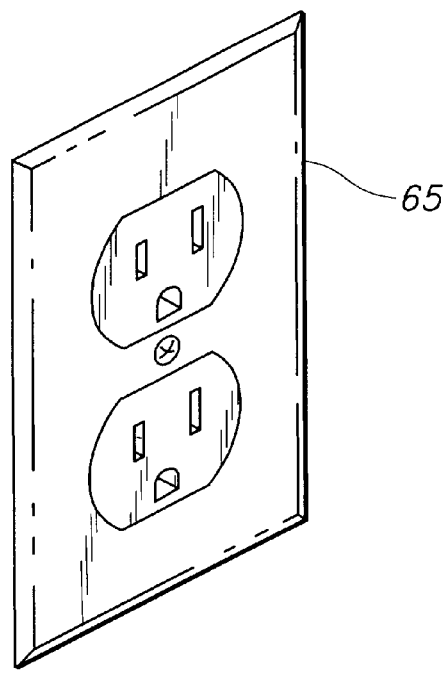
FIG. 2 is a perspective view of a typical wall outlet covered by a typical wall plate.
Figure 3:
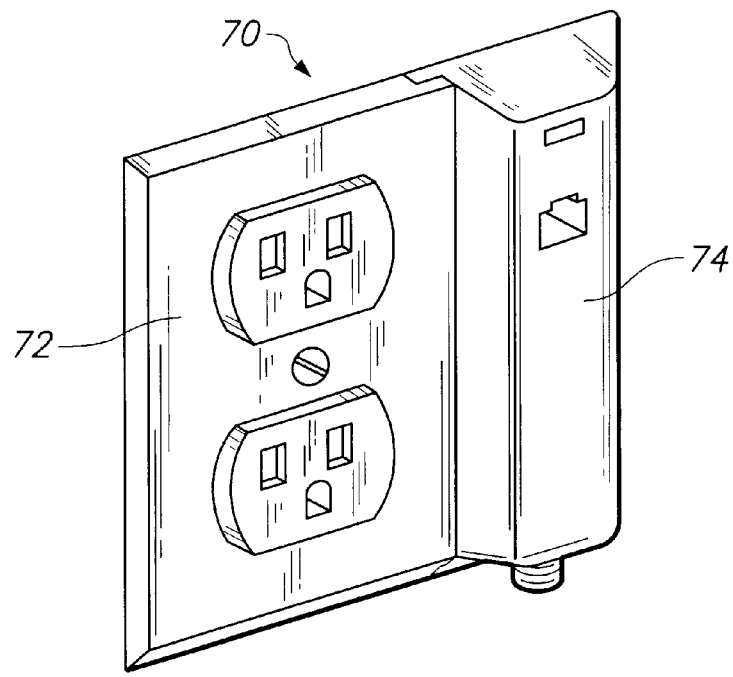
FIG. 3 is a perspective view of a preferred embodiment of a replaceable wall plate in accordance with the present invention.

For clarity purposes, FIG. 2 illustrates how a typical wall plate 65 fastens to and covers up a typical duplex receptacle to form a wall outlet. Along the same line, FIG. 3 illustrates a perspective view of a preferred embodiment of a replaceable wall plate 70 having a wall plate portion 72 and a replaceable portion 74 in accordance with the present invention. The wall plate 70 is preferably made of plastics; however, other materials, such as metal and wood, are also acceptable. The wall plate portion 72 is screwed to cover and form a wall outlet (not shown) whereas the replaceable portion 74 is removably attached to the wall plate portion 72. The replaceable portion 74 has a hollow body wherein electronics such as surge protection circuitry is built-in and contained. Also, although not illustrated, the face of the replaceable portion 74 preferably may include a status LED, or if desired, a circuit test button. Other connectors such as phone jacks and coaxial cable connectors may also be preferably disposed on the replaceable portion 74 for allowing additional devices to be protected by the built-in surge protection circuitry (a status LED and device connectors such as a phone jack and a coaxial cable are illustrated on the replaceable portion 74 in FIG. 3).

Figure 4:
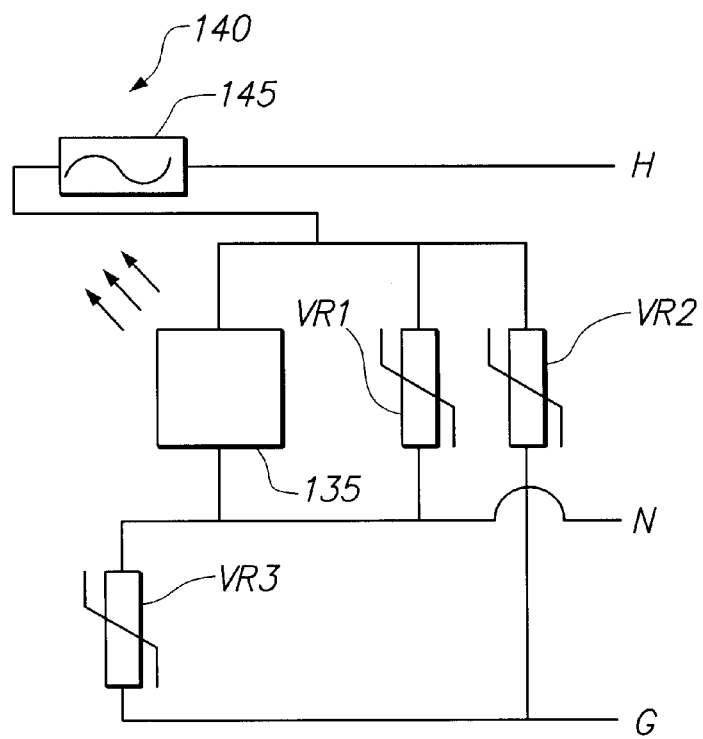
FIG. 4 is a circuit diagram illustrating a surge protection device of a preferred embodiment of the present invention.

Referring now to FIG. 4, it is a circuit diagram illustrating a surge protection circuitry 140 of a preferred embodiment of the present invention. In conjunction with FIG. 3, the circuitry 140 is disposed inside the hollow body of the replaceable portion 74. It 140 also has a H line, a N line and a G line electrically connected, respectively, to the hot, neutral and ground of the power line during operation. The circuitry 140 further includes a varistor VR1 and a LED circuit 135 each connecting to the H line and the N line, a varistor VR2 connecting to the H line and to the G line and a varistor VR3 connecting to the N line and the G line. Also, a fuse element 145 is disposed on the H line.

One aspect of the invention may include a capacitor element (not shown) disposed in electrical parallel with the VR1 between the H line and the N line for EMI and/or RFI removal. The suitable values for this capacitor can be easily obtained without undue experimentation.

The varistors are preferred be metal oxide varistor, and they are nonconductive so that they generate open circuits when normal voltages are applied to the electrical outlet. However, when voltage surges occur at levels above normal voltage levels, the varistors become immediately conductive, and they establish short circuits that divert the voltage surges away from the electrical appliances or devices plugged into the electrical outlet at the time. In other words, during normal voltages, VR1, VR2 and VR3 of the surge protection circuitry 140 create open circuits. And in that case, all varistor connections are open circuits. During normal operation, the LED circuit 135 provides light emission as a status indicator. Each varistor protects a line connection, for example, VR1 protects the H-N line connection, VR2 protects the H-G connection and VR3 protects the N-G line connection. During sudden voltage surges, one or more varistors, VR1, VR2 and/or VR3 may immediately be short circuited thereby shunting all of the surge power away from the electrical appliances plugged in at the time.

In the case where the varistors do not respond properly especially when voltage surges climb gradually and steadily, the fuse element 145 which normally acts as a short circuit will in that case respond by burning the line into an open circuit. As a result, the LED circuit 135 goes OFF and indicates to users that attention is needed for appliance inspection. The fuse element 145 may be disposed in series on any of the three lines (H, N, or G line) and in terms of construction, the element 145 may be a fuse, a melt-able conductor or a fuse-like resistor.

FIG. 5, FIG. 6 and FIG. 7 illustrate respectively the front, rear and side views of a wall plate portion 80 of a preferred embodiment configured for prong-insertion attachment. This wall plate portion 80 has a flange 81 disposed on an attachment side of the wall plate portion 80. It also has receptacles disposed on a face of the portion 80 each having a hot prong aperture 87, a neutral prong aperture 88 and a ground prong aperture 89 for receiving the plug prongs of an electrical device (not shown). This wall plate portion 80 further has three fastening prongs 82 for attachment to a replaceable portion 90 as illustrated in its side view in FIG.8. The replaceable portion 90 is further configured to have three recesses 92 that are appropriately disposed to receive the three fastening prongs 82. As the prongs 82 are inserted into the recesses 92, the replaceable portion 90 is thereby removably attached to the wall plate portion 80. The prongs 82 are preferably made of the type of material similar to that of the wall plate portion 80 or that of the replaceable portion 90; however, other materials for such attachment purposes are equally acceptable. Advantageously, the replaceable portion 90 along with its built-in surge protection circuitry 140 (shown in FIG. 4) could be removed and replaced such as in the case of electronics failure by simply pulling the failed replaceable portion 90 away from the wall plate portion 80 in a side-way direction in order to release the prong-insertion coupling. Subsequently, a new replaceable portion may be re-attached to the wall plate portion 80 without even having to remove the wall plate portion 90 from the wall outlet.

The wall plate portion 80 also includes a hot conductor 83, a neutral conductor 84 and a ground conductor 85. All of the conductors 83,84,85 are fastened to the rear side of the wall plate portion 80 using typical manufacturing methods. As shown in FIG. 6, one end of the hot conductor 83 leads to the attachment side of the wall plate portion 80. As the prongs 82 are inserted into the recesses 92, the part of the hot conductor 83 typically fastened to the flange 81 of the wall plate portion 80 makes sliding electrical contact with the H line (not shown in FIG. 6) of the surge protection circuitry 140 of the replaceable portion 90. Numerous other well-known designs are available for artisans to implement the making of electrical contact between the hot conductor 83 and the H line of the built-in circuitry 140, and those skilled in the art can easily accomplish the design without undue experimentation. This hot conductor 83 is further extended to the hot prong apertures 87 of the wall plate portion 80 for making electrical contact with an inserted hot prong of an electrical plug. For clarification purposes, this is illustrated in FIG. 6 only for one receptacle. Typical engineering design efforts would readily provide conductor 83,84,85 configurations, such as J-hooks disposed next to the apertures 87,88,89 for better electrical contact with any inserted plug prongs. Furthermore, as shown in FIG. 6, FIG. 7 and FIG. 8, same type of construction is applied similarly to the neutral conductor 84 as well as the ground conductor 85. As the two portions 80,90 are coupled together, the neutral conductor 84 and the ground conductor 85 would electrically feed into N line and G line of the surge protection circuitry 140 of the replaceable portion 90, respectively. In the above manner, the replaceable portion 90 is thus configured such that the surge protection circuitry 140 receives electricity only when prongs of a plug are inserted through the apertures 87,88,89.

As mentioned earlier, there are numerous known ways to electrically attach the replaceable portion 90 to the wall plate portion 80. In addition to the prong-insertion attachment, one may preferably use the button coupling method (not shown) wherein the three conductors 83,84,85 typically fastened to the wall plate portion 80 disposed on or near the flange 81 as three conductive buttons so that they would connect to and couple with three matching buttons on the replaceable portion 90. These matching buttons being electrically and individually connected to the three conductors 83,84,85 subsequently lead to become the H, N and G lines of the built-in circuitry 140 of the replaceable portion 90, respectively. Additionally, one may prefer to use the channel sliding method (not shown) for attachment wherein the two portions 80,90 are coupled together using matching and interlocking channels disposed on the flange 81 as they slide against each other vertically.

While the present invention has been described in terms of several preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What I claim is:

1. A wall plate apparatus having a wall plate portion and a replaceable portion, said wall plate apparatus comprising:

the wall plate portion including a hot prong aperture, a neutral prong aperture and a ground prong aperture for receiving a hot prong, a neutral prong and a ground prong, respectively, of a plug for an electrical device, said wall plate portion further including a hot conductor, a neutral conductor and a ground conductor each having one end leading toward an attachment side of the wall plate portion in the rear side of the wall plate portion and having another end leading to the hot prong aperture, the neutral prong aperture and the ground prong aperture, respectively, whereby making electrical contact with the prongs of the plug, the wall plate portion further including at least one prong extending out in a side way direction from the attachment side of the wall plate portion; and the replaceable portion including built-in electronics and recesses disposed near a side of the replaceable portion, said recesses being configured to receive said at least one prong of the wall plate portion whereby removably coupling together the wall plate portion and the replaceable portion, said replaceable portion further including H, N and G lines being configured as conducting strips such that as a result of the coupling of the two portions, electrical contact being made, respectively, between the H, N and G lines of the replaceable portion and the hot, neutral and ground conductors of the wall plate portion.

2. The wall plate apparatus recited in claim 1 wherein the at least one prong extending out in a side way direction from the attachment side of the wall plate portion numbers three prongs.

3. The wall plate apparatus recited in claim 1 wherein the attachment side of the wall plate portion includes a flange.

4. The wall plate apparatus recited in claim 1 wherein the built-in electronics is a surge protection circuitry.

5. The wall plate apparatus recited in claim 1 wherein the apparatus further includes status indicator disposed on a face of the replaceable portion.

6. The wall plate apparatus recited in claim 1 wherein the apparatus further includes at least one device connector disposed on a face of the replaceable portion.

7. The wall plate apparatus recited in claim 6 wherein the at least one device connector includes a phone jack.

8. The wall plate apparatus recited in claim 6 wherein the at least one device connector includes a coaxial cable connector.

9. A wall plate apparatus having a wall plate portion and a replaceable portion, said wall plate apparatus comprising:

the wall plate portion including a hot prong aperture, a neutral prong aperture and a ground prong aperture for receiving a hot prong, a neutral prong and a ground prong, respectively, of a plug for an electrical device, said wall plate portion further including a hot conductor, a neutral conductor and a ground conductor each having one end leading toward an attachment side of the wall plate portion in the rear side of the wall plate portion and having another end leading to the hot prong aperture, the neutral prong aperture and the ground prong aperture, respectively, whereby making electrical contact with the prongs of the plug, the wall plate portion further including means for removably attaching said wall plate portion to said replaceable portion; and the replaceable portion including built-in electronics and matching means for coupling with said means for removably attaching of the wall plate portion whereby removably coupling together the wall plate portion and the replaceable portion, said replaceable portion further including H, N and G lines being configured as conducting strips such that as a result of the coupling of the two portions, electrical contact being made, respectively, between the H, N and G lines of the replaceable portion and the hot, neutral and ground conductors of the wall plate portion.

10. The wall plate apparatus recited in claim 9 wherein the built-in electronics is a surge protection circuitry.

11. The wall plate apparatus recited in claim 9 wherein the apparatus further includes status indicator disposed on a face of the replaceable portion.

12. The wall plate apparatus recited in claim 9 wherein the apparatus further includes at least one device connector disposed on a face of the replaceable portion.

13. The wall plate apparatus recited in claim 12 wherein the at least one device connector includes a phone jack.

14. The wall plate apparatus recited in claim 12 wherein the at least one device connector includes a coaxial cable connector.

15. The wall plate apparatus recited in claim 9 the said means for removably attaching and said matching means are electrically coupled to the hot, neutral, ground conductors and the H, N and G lines.

16. The wall plate apparatus recited in claim 15 wherein the said means for removably attaching and said matching means each includes three conductive matching buttons.

17. A wall plate apparatus having a wall plate portion and a replaceable portion, said wall plate apparatus comprising:

the wall plate portion including a hot prong aperture, a neutral prong aperture and a ground prong aperture for receiving a hot prong, a neutral prong and a ground prong, respectively, of a plug for an electrical device, said wall plate portion further including a hot conductor, a neutral conductor and a ground conductor each having one end leading toward an attachment side of the wall plate portion in the rear side of the wall plate portion and having another end leading to the hot prong aperture, the neutral prong aperture and the ground prong aperture, respectively, whereby making electrical contact with the prongs of the plug, the wall plate portion further including means for removably attaching said wall plate portion to said replaceable portion;

the replaceable portion including built-in electronics and matching means for coupling with said means for removably attaching of the wall plate portion whereby removably coupling together the wall plate portion and the replaceable portion, said replaceable portion further including H, N and G lines being configured as conducting strips such that as a result of the coupling of the two portions, electrical contact being made, respectively, between the H, N and G lines of the replaceable portion and the hot, neutral and ground conductors of the wall plate portion; and said means for removably attaching and said matching means each including three conductive matching buttons and being electrically coupled to the hot, neutral, ground conductors and the H, N and G.

* * * * *